United States Patent
Chan et al.

(10) Patent No.: US 9,990,371 B2
(45) Date of Patent: Jun. 5, 2018

(54) CLASSIFICATION OF DATA OBJECTS IN A DISTRIBUTED FILE SYSTEM BASED ON APPLICATION CREATION AND/OR ACCESS INFORMATION

(71) Applicant: Razer (Asia-Pacific) Pte. Ltd., Singapore (SG)

(72) Inventors: Michael A. Chan, San Francisco, CA (US); Justin Quan, San Francisco, CA (US); Daniel R. Bornstein, San Francisco, CA (US); Tom Moss, Los Altos, CA (US); Linda Tong, San Francisco, CA (US)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 302 days.

(21) Appl. No.: 14/220,803

(22) Filed: Mar. 20, 2014

(65) Prior Publication Data

US 2014/0289190 A1    Sep. 25, 2014

Related U.S. Application Data

(60) Provisional application No. 61/804,134, filed on Mar. 21, 2013.

(51) Int. Cl.
*G06F 17/30* (2006.01)
*G06F 9/54* (2006.01)
(Continued)

(52) U.S. Cl.
CPC ......... *G06F 17/30174* (2013.01); *G06F 9/54* (2013.01); *G06F 11/1464* (2013.01);
(Continued)

(58) Field of Classification Search
CPC ......... G06F 17/30174; G06F 17/30076; G06F 17/30115; G06F 17/30082;
(Continued)

(56) References Cited

U.S. PATENT DOCUMENTS 6,646,658 B1 * 11/2003 Chrisop ............ G06F 17/30067
707/E17.01
7,882,077 B2 * 2/2011 Gokhale ........... G06F 17/30622
707/673

(Continued)

OTHER PUBLICATIONS

Chang, Deep Shot: A Framework for Migrating Tasks Across Devices Using Mobile Phone Cameras, 2011, pp. 1-10.*

(Continued)

*Primary Examiner* — Albert Phillips, III
(74) *Attorney, Agent, or Firm* — Mattingly & Malur, PC (57) ABSTRACT

Technology is disclosed for classification of data objects (e.g., files) in a distributed file system based on application creation and/or access information. In some embodiments, data objects of a user are stored across multiple computing devices associated with a user, e.g., mobile computing devices such as a tablet, a laptop, or a smartphone, and/or at server systems, e.g., cloud-based storage servers, in a distributed cloud-based storage system. The technology described tracks the applications that create or touch particular data objects in the distributed file system and classifies the data objects according to these applications resulting in various application classifications. For example, a classification engine can process data objects in the distributed file system to identify an application that created the data object and/or applications that have accessed the data object. The classification information can be saved by, for example, a cloud-based storage server.

16 Claims, 8 Drawing Sheets

(51) Int. Cl.
  *H04L 29/08* (2006.01)
  *G06F 11/14* (2006.01)
  *H04L 12/24* (2006.01)
  *H04L 12/911* (2013.01)
  *H04L 29/06* (2006.01)
  *H04W 12/06* (2009.01)

(52) U.S. Cl.
  CPC .... *G06F 17/3053* (2013.01); *G06F 17/30073* (2013.01); *G06F 17/30076* (2013.01); *G06F 17/30082* (2013.01); *G06F 17/30115* (2013.01); *G06F 17/30126* (2013.01); *G06F 17/30144* (2013.01); *G06F 17/30176* (2013.01); *G06F 17/30194* (2013.01); *G06F 17/30575* (2013.01); *H04L 41/0816* (2013.01); *H04L 47/70* (2013.01); *H04L 47/78* (2013.01); *H04L 63/0853* (2013.01); *H04L 67/06* (2013.01); *H04L 67/10* (2013.01); *H04L 67/1095* (2013.01); *H04L 69/04* (2013.01); *H04W 12/06* (2013.01); *G06F 11/1451* (2013.01); *G06F 11/1469* (2013.01)

(58) Field of Classification Search
  CPC ......... G06F 17/30176; G06F 17/30073; G06F 17/30126; G06F 17/30144; G06F 9/54; G06F 17/3053; H04L 67/06; H04L 63/0853; H04L 69/04
  See application file for complete search history.

(56) References Cited

U.S. PATENT DOCUMENTS 8,055,622 B1* 11/2011 Botes ................ G06F 17/30188
  707/640
2013/0262392 A1* 10/2013 Vibhor .............. G06F 17/30557
  707/654
2014/0244580 A1* 8/2014 Eisner ............... G06F 17/30082
  707/623

OTHER PUBLICATIONS

Wang, Characterizing and Supporting Cross-Device Search Tasks, Feb. 2013, pp. 1-10.*

* cited by examiner

CLASSIFICATION OF DATA OBJECTS IN A DISTRIBUTED FILE SYSTEM BASED ON APPLICATION CREATION AND/OR ACCESS INFORMATION

PRIORITY CLAIM

This application claims the benefit of U.S. Provisional Patent Application No. 61/804,134, entitled "OPERATING SYSTEM AND DEVICE INTEGRATED WITH CLOUD COMPUTING FUNCTIONALITIES", filed on Mar. 21, 2013, which is incorporated by reference herein in its entirety.

FIELD OF THE INVENTION

At least one of the disclosed embodiments relate to cloud computing, and more particularly, to classification of data objects (e.g., files) in a distributed file system based on the applications that create and/or access the data objects.

BACKGROUND

Use of computing devices to perform various tasks has become ubiquitous. For example, a person may use any number of computing devices to perform various tasks throughout the course of a day. Often, any one of these devices can be used to perform one or more of the various tasks. However, once a user begins a task on a particular computing device, there is very limited ability to continue that task on a different computing device. That is, the computing devices do not automatically synchronize with each other to facilitate migration of a task among the different computing devices.

Furthermore, even if the computing devices were able to synchronize with one another to facilitate migration of a task among different computing devices, such synchronization would not be performed intelligently. For example, data stored on a first computing device may synchronized to a second computing device even when the second computing device is unlikely to use some or all of that data.

DETAILED DESCRIPTION

Technology is disclosed for classification of data objects (e.g., files) in a distributed file system based on application creation and/or access information. In some embodiments, data objects of a user are stored across multiple computing devices associated with a user, e.g., mobile computing devices such as a tablet, a laptop, or a smartphone, and/or at server systems, e.g., cloud-based storage servers, in a distributed cloud-based storage system. The described technology tracks the applications that create or touch particular data objects in the distributed file system and classifies the data objects according to these applications resulting in various application classification information. For example, a classification engine can process data objects in the distributed file system to identify an application that created the data object and/or applications that have accessed the data object. The application classification information can be saved by, for example, a cloud-based storage server.

In some embodiments, the application classification information can be utilized by a cloud-storage server and/or a distributed file system for any number of purposes including, but not limited to, intelligent synchronization. For example, a synchronization event may be triggered to synchronize data objects on an SD-card associated with a particular computing device with other computing devices in the distributed file system. The classification information can indicate the applications associated with (e.g., created by or accessed by) each data object. Thus, the classification information can be utilized to de-prioritize (or otherwise modify) synchronization of certain of the data objects to the particular computing device if the data objects are associated with applications that, for example, are not installed on the device.

Some of the examples described herein utilize the described technology (e.g., classification of data objects in a distributed file system) for the purposes of intelligent storage and/or synchronization. However, it is appreciated that the described technology can be used for any number of purposes in the context of a distributed file system.

Environment

Figure 1:
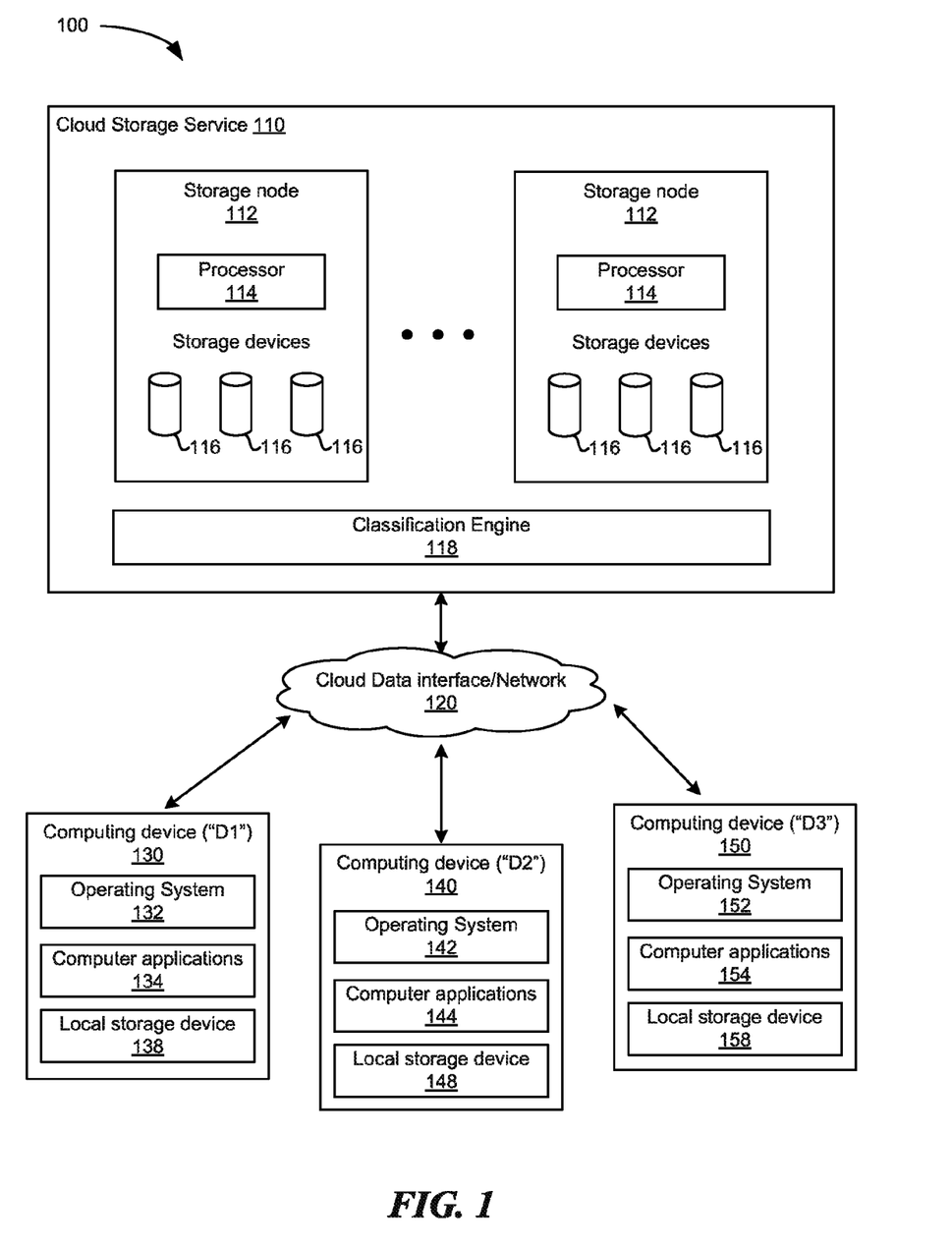
FIG. 1 is a block diagram illustrating an example cloud-based storage environment in which data objects in a distributed file system can be classified.

FIG. 1 is a block diagram illustrating an example cloud-based storage environment 100 in which data objects in a distributed file system can be classified. The cloud-based storage environment 100 includes a cloud storage service 110, which can include one or more cloud-based storage servers that are configured to handle communications with computing devices 130-150. The cloud storage service 110 contains storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage, or any other computer storage medium which can be used to store the desired information.

A cloud data interface 120 can also be included to receive data from and send data to computing devices 130-150. The cloud data interface 120 can include network communication hardware and network connection logic to receive the information from computing devices. The network can be a local area network (LAN), wide area network (WAN), or the Internet. The cloud data interface 120 may include a queuing mechanism to organize data updates received from or sent to the computing devices 130-150.

In some embodiments, any communication between the computing devices 130-150 is routed through the cloud storage service 110. For example, data related to computer applications 134-154 or data files to be stored in the cloud-based storage environment 100, can be exchanged between the computing devices 130-150 through cloud storage service 110. In some embodiments, where the computing devices 130-150 can communicate with each other directly using a P2P communication technique, e.g. Bluetooth, the cloud storage service 110 facilitates the computing devices 130-150 to communicate directly for exchanging the data. In some embodiments, the computing devices 130-150 can communicate directly with each other without any coordination by the cloud storage service 110. In some embodiments, while the computing devices 130-150 send/receive the data directly, the cloud storage service 110 may also obtain a copy of the data.

Although FIG. 1 illustrates three computing devices 130, 140 and 150, a person having ordinary skill in the art will readily understand that the technology disclosed herein can be applied to any number of computing devices connected to the cloud storage service 110.

The computing devices 130-150 include operating systems 132-152 that manage hardware resources of the computing devices 130-150 and provide services for computer applications 134-154 (e.g., mobile applications running or executing on mobile devices). The operating systems 132-152 facilitate execution of the computer applications 134-154 on the computing devices 130-150. The computing devices 130-150 each include at least one local storage device 138-158, respectively, to store the computer applications 134-154 and/or user data. Each computing device 130-150 can be a desktop computer, a laptop computer, a tablet computer, an automobile computer, a game console, a smartphone, a personal digital assistant, or other computing devices capable of running computer applications, as contemplated by a person having ordinary skill in the art. Some examples of the operating system 132-152 include Android, iOS, Windows, etc.

The computer applications 134-154 stored in the computing devices 130-150 can include applications for general productivity and information retrieval, including email, calendar, contacts, stock market and weather information. The computer applications 134-154 can also include applications in other categories, such as mobile games, factory automation, GPS and location-based services, banking, order-tracking, ticket purchases, or any other categories as contemplated by a person having ordinary skill in the art.

The network connections between the computing devices 130-150 and the cloud storage service 110 can include, but are not limited to, Transmission Control Protocol (TCP) connections, User Datagram Protocol (UDP) connections, and/or other types of network connections based on other protocols. When multiple computer applications 134-154 need network connections to multiple remote servers, the computing devices 130-150 only need to maintain one network connection with the cloud storage service 110. The cloud storage service 110 can in turn maintain multiple connections with the remote servers on behalf of the computer applications 134-154.

In some embodiments, a user, e.g., a user associated with the computing devices 130-150, can synchronize and/or backup data files across multiple computing devices 130-150. Alternatively or additionally, the user can back up the data files to the cloud storage service 110. That is, the distributed cloud-based storage environment 100 facilitates synchronizing and/or backing up of the user's data files from the computing devices 130-150 to the cloud storage service 110 or from the cloud storage service 110 to the computing devices 130-150. The data files are synchronized or backed up across the computing devices 130-150 based on various policies. The policies can be designed to optimize the cloud-based storage environment 100 in various aspects, including to minimize the response time in accessing the data files, improving storage space utilization across the computing devices, or storing particular data files in a particular computing device based on the user preference, e.g., to provide convenience.

The cloud storage service 100 includes a distributed file system. That is, a data object can be stored on one or more devices and mirrored and/or synchronized with other devices. For example, when a user requests access to a particular data file in the cloud storage service 100 using a particular computing device, e.g., computing device 130, the cloud storage service 100 or the computing device first determines whether the data object (e.g., file) is stored locally and whether it is up-to-date. If the file needs to be updated or is not stored locally, the data object can be requested from a cloud-based storage server, e.g., one or more storage nodes 112 of the cloud storage service 100.

In some embodiments, elements of the cloud storage service 110, e.g., one or more cloud storage servers, track the applications that create or touch particular data objects in the distributed file system and classify the data objects according to the application classification information. For example, the classification engine 118 can process data objects in the distributed file system to identify an application that created the data object and/or applications that have accessed the data object. The classification information can be saved by, for example, a cloud-based storage server.

In some embodiments, the classification information can be utilized by a cloud-storage server and/or a distributed file system for any number of purposes including, but not limited to, intelligent synchronization based on the classification information. For example, a synchronization event may be triggered to synchronize files stored on an SD-card of a user's phone with the cloud-based service and/or another computing device in the distributed file system that is associated with the user (e.g., the user's tablet computer). The application classification information can be used to determine if files stored on the SD-card should be synchronized (e.g., downloaded) to the tablet computer. For example, if the tablet computer does not have an application installed that was used for creating one or more files or directories, then those files and/or directories (file structure) will not be synchronized with the tablet computer. Alternatively or additionally, file structure may be synchronized but not the files themselves.

Figure 2A:
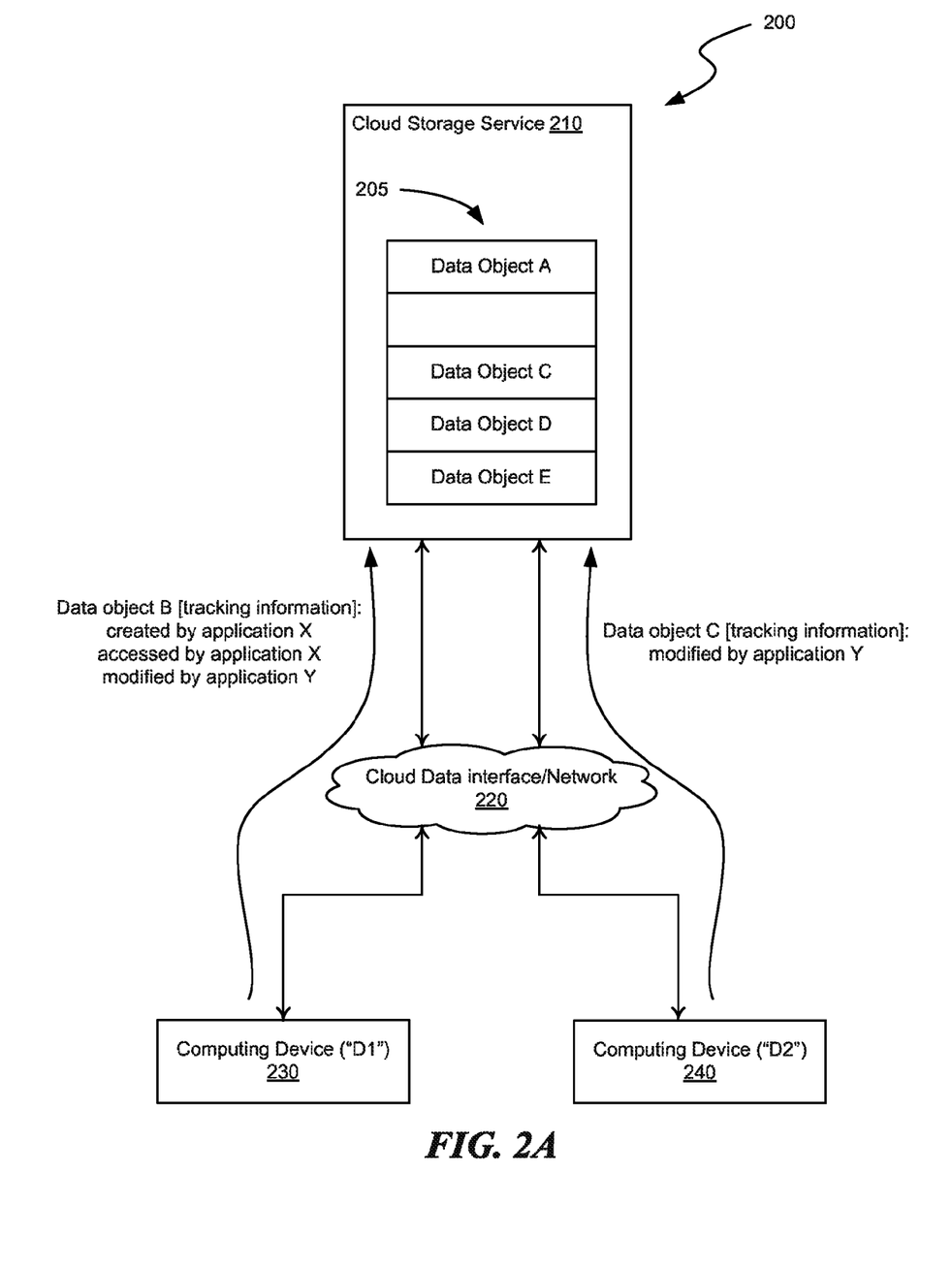
FIGS. 2A and 2B are block diagrams illustrating an example classification of data objects in a distributed file system.
Figure 2B:
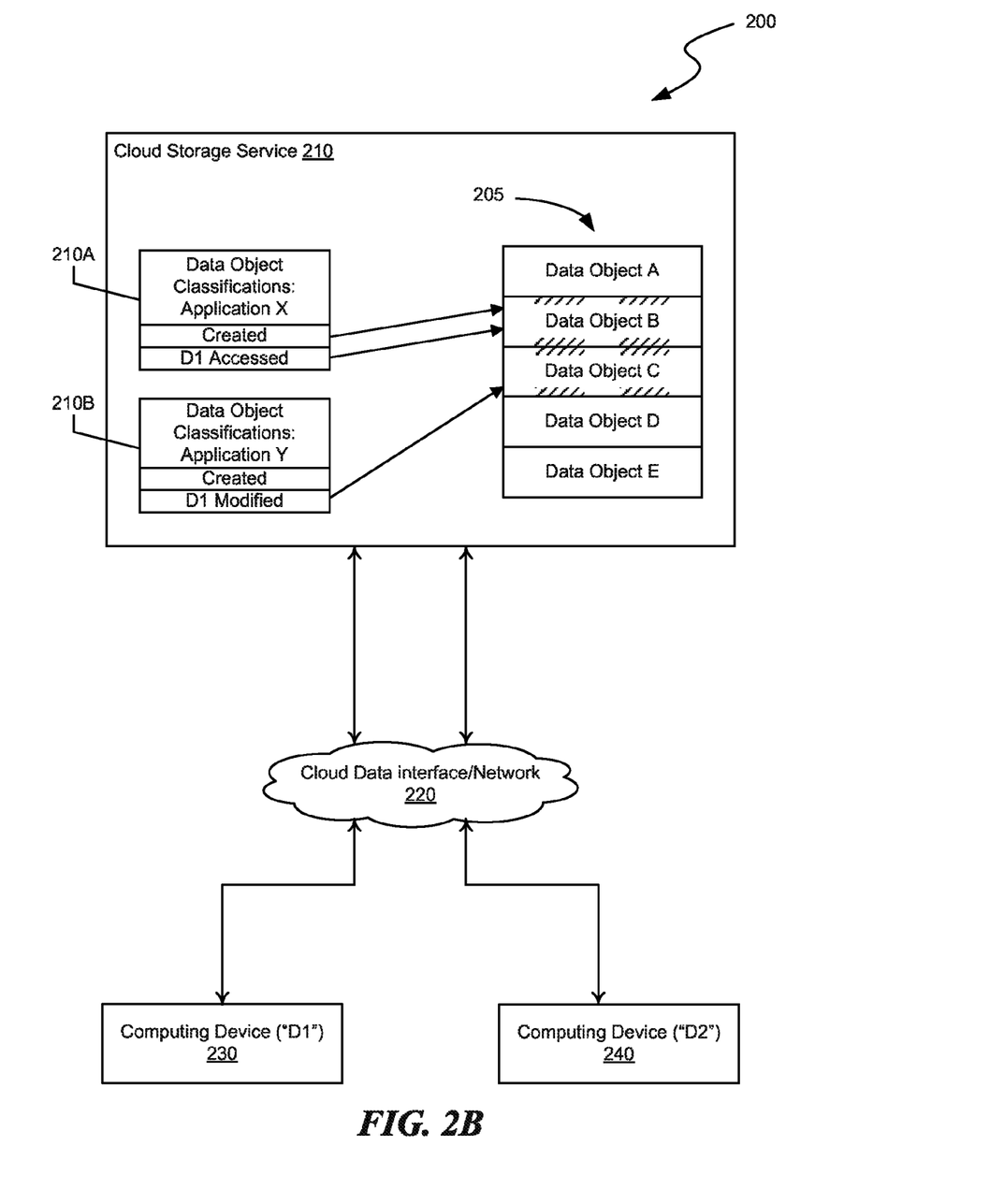

FIGS. 2A and 2B are block diagrams illustrating an example of classification of data objects in a distributed file system, according to an embodiment. The distributed file system includes a cloud-based file system 205 of cloud storage service 210 that is in communication with and synchronizable with file systems of computing devices D1 and D1, 230 and 240 respectively. The distributed file system comprises one or more of the file systems. The communication devices D1 and D2 may be the communication devices 130-150 of FIG. 1, although alternative configurations are possible. Likewise cloud storage service 210 may be cloud storage service 110 of FIG. 1, although alternative configurations are possible.

As discussed above, the applications that create or access particular data objects can be tracked by the cloud storage service and/or computing devices. In this example, tracking information is provided by the computing devices D1 and D2. It is appreciated that the tracking information may be alternatively or additionally tracked and/or otherwise determined (e.g., by scanning discussed with respect to FIG. 3) by the cloud storage service 210.

Referring first to FIG. 2A, which illustrates communication devices D1 and D2 providing application tracking information to the cloud storage service 210, according to an embodiment. The tracking information may be provided by the communication devices responsive to, e.g., modifications, access by a user, periodically, or responsive to an external query (e.g., from the cloud storage service). In the example of FIG. 2A, the cloud-based file system 205 includes data object A, C, D, and E. Computing device D1 sends tracking information to cloud storage service 210 indicating that data object B is created by application X, accessed by application X and modified by application Y. Likewise, computing device D2 sends tracking information indicating that data object C is modified by application Y.

FIG. 2B illustrates that data objects B and C have been modified (shown with cross-shading) in cloud-based file system 205. The cloud storage service 210 must track and/or otherwise identify modified data objects in order to synchronize with other computing devices, if necessary. Additionally, one or more cloud-based storage servers of the cloud storage service 210 classify the data objects according to the application information. In this example, additional data objects 210A and 210B are created for applications X and Y, respectively, however, it is appreciated that distinct data objects may not be created by the system. For example, additional field information can be added to each data object. In this example, object 210A indicates (e.g., via link, linked list, etc.) which data object(s) are created, access, and/or modified by application X. Likewise, object 210B indicates (e.g., via link, linked list, etc.) which data object(s) are created, access, and/or modified by application Y.

Figure 3:
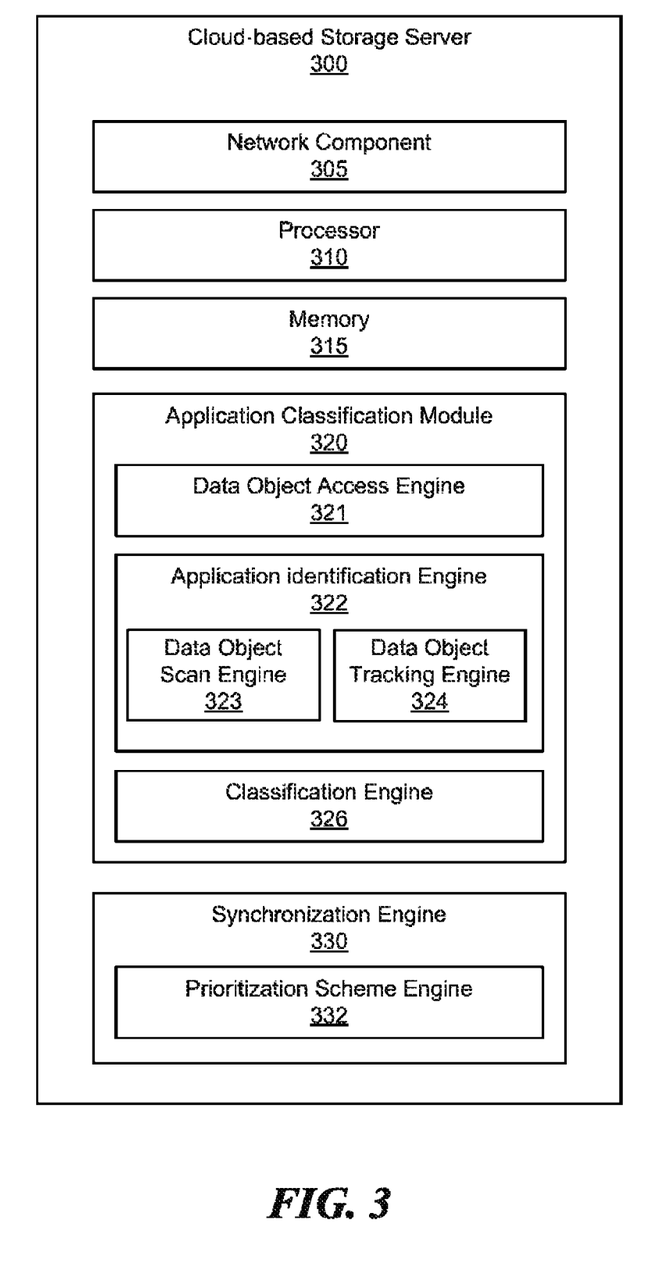
FIG. 3 is a block diagram illustrating example components of a cloud-based server in a cloud-based storage environment having a distributed file system.

FIG. 3 is a block diagram illustrating example components of a cloud-based storage server 300 in a cloud-based storage environment having a distributed file system such as, for example, cloud-based storage environment 100 of FIG. 1, according to an embodiment. Cloud-based storage server 300 can be, e.g., a dedicated standalone server, or implemented in a cloud computing service having a plurality of servers. In this example, the cloud-based storage server 110 includes a network component 305, a processor 310, a memory 315, an application classification module 320, and a synchronization module. Additional or fewer components are possible.

The memory 315 can include instructions which when executed by the processor 310 enables the cloud-based storage server 300 to perform the functions described herein including classification of the data objects based on application creation and/or access information. The network component 305 is configured for network communications with the computing devices, e.g., computing devices 130-150. The network communications can include, for example, receiving data files from the computing devices, sending data files to the computing devices upon access requests or synchronization events, or receiving requests for backup, access, or synchronization.

The application classification module 320 implements the classification engine 118 of FIG. 1 for facilitating data object classification, including various data object classification based on the applications creating and/or accessing the data objects. As shown in the example of FIG. 3, application classification module 320 includes a data object access engine 321, an application identification engine 322, and a classification engine 326. The data object access engine 321 accesses data objects from the distributed file system.

The application identification engine 322 identifies applications that create and/or access data objects in the distributed file system. The applications that create and/or access the data objects can be identified in any number of ways. For example, data objects can be scanned to identify application information or tracked. The tracking can be performed by a cloud-based storage server, e.g., cloud-based storage server 110, and/or by one or more of the computing devices, e.g., computing devices 130-150. The application identification engine 322 includes a data object scan engine 323 and a data object tracking engine 324. The data object scan engine 323 scans data objects for identifiers or markers that identify the applications that created the respective data objects. Similarly, the data object tracking engine 324 individually tracks which applications access data objects in the distributed file system. Alternatively or additionally, the data object tracking engine 324 receives the tracking information from one or more of the computing devices. The classification engine 326 classifies the data objects based on the applications that created the data object and/or the applications that accessed the data object.

Figure 4:
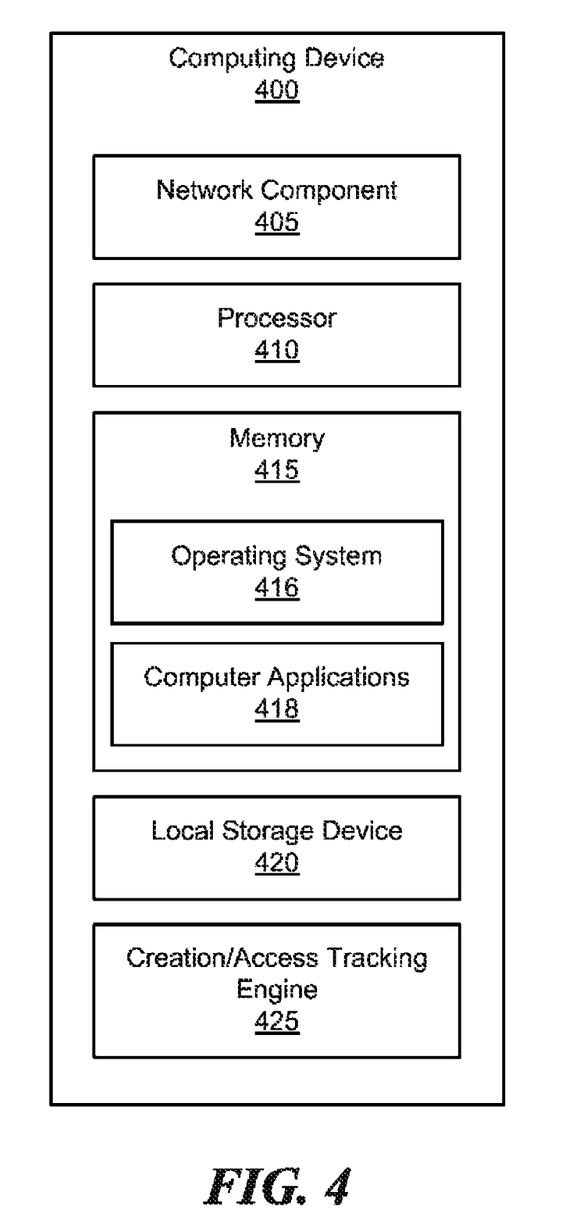
FIG. 4 is a block diagram illustrating example components of a computing device in a cloud-based storage environment having a distributed file system.

FIG. 4 is a block diagram illustrating example components of a computing device 400 in a cloud-based storage environment having a distributed file system such as, for example, cloud-based storage environment 100 of FIG. 1, according to an embodiment. The computing device 400 can be one of computing devices 130-150 of FIG. 1, although alternative configurations are possible. The computing device 400 can include a network component 405, a processor 410, a memory 415, a local storage device 420, and a creation/access tracking engine 425. The memory 415 can store instructions of the operating system 416 for computing device 400. The memory 415 can further store instructions of the computer applications 418 designed to run or execute at (or on) the computing device 400.

The network component 405 can be capable of switching between states including a high power consumption state and a low power conservation state. The network component 405 can be, e.g. a Wi-Fi networking adapter, a cellular phone networking adapter, or a combination thereof. The processor 410 is configured to execute the computer applications 416 and the operating system 132 of the computing device 400. The memory 415 stores instructions of the operating system 416 which, when executed by the processor 410, cause the operating system 416 to perform processes for realizing certain functionalities of the computing device 400. For instance, the process of the operating system 416 can facilitate access of data objects from the distributed file system, tracking of the applications accessing these data objects, and various transfers of data from or to other computing devices 140-150 and/or cloud-based storage server 300.

The local storage device 420, as described above, can store the instructions, the operating system 416, user data such as profile data of the user, data files of the user, and any other data necessary for the operation of the computing device 400 and execution of the computer applications 418.

The computing device 400 also includes the creation/access tracking engine 425 that tracks the applications that create and/or access data objects. In some embodiments, the creation/access tracking engine 425 provides this information to the cloud storage service 110 or the cloud-based storage server 400 for use in classification of the data objects as described herein.

Figure 5:
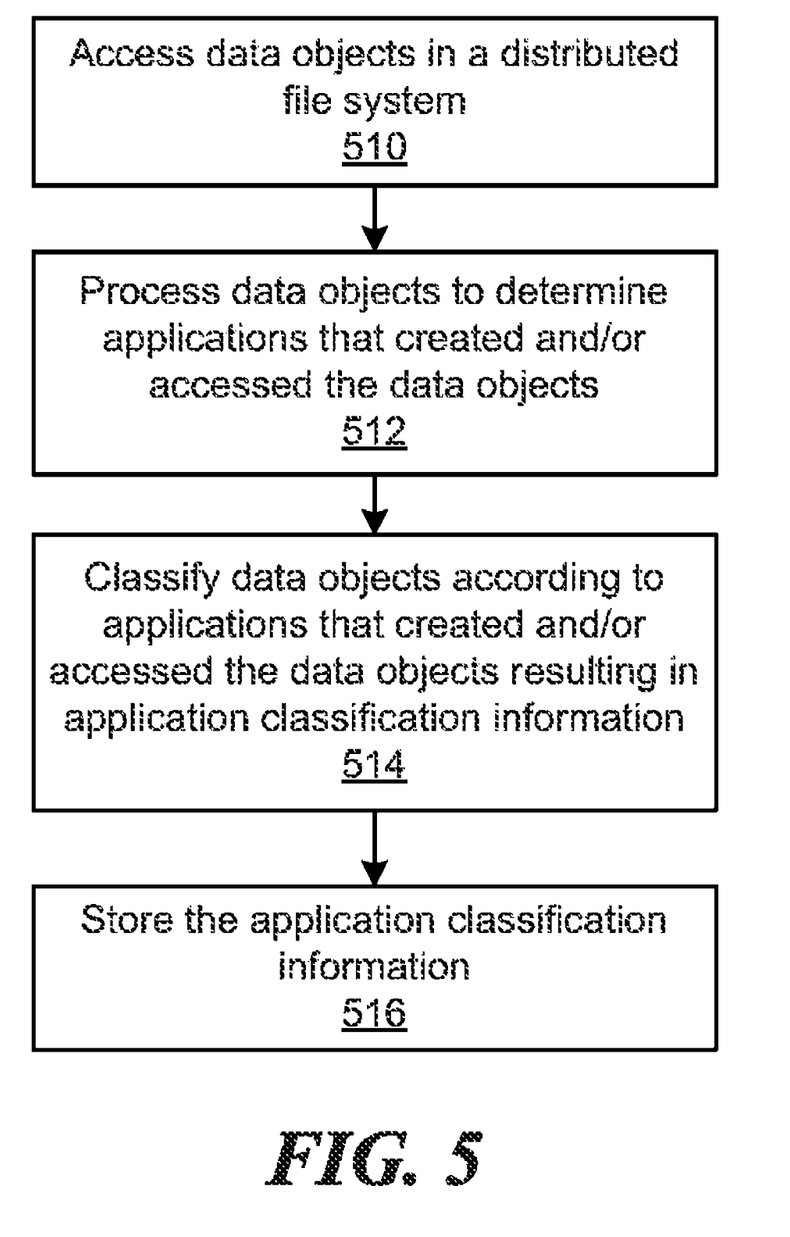
FIG. 5 is a flow diagram illustrating an example process of classifying data objects in a distributed file system based on application creation and/or access information.

FIG. 5 is a flow diagram illustrating an example process of classifying data objects in a distributed file system based on application creation and/or access information, according to an embodiment. One or more cloud-based storage server of a cloud storage service e.g., cloud storage service 110 of FIG. 1, among other functions, perform the example process 500.

To begin, at step 510, the cloud-based storage server accesses data objects in a distributed file system. The data objects can be any type of data file. For example, a data object can be an image, an audio file, a video file, a document, an email, etc. The format of the file can include, but is not limited to, any of a Joint Photographic Experts Group (JPEG), a bitmap, a Microsoft Word document, a Portable Document Format (PDF), MP3, Advanced Audio Coding (AAC), etc.

In some embodiments, prior to access, the cloud-based storage server can receive the data objects or modifications to the data objects from the one or more remote computing devices and store the data objects or modifications to the data objects in the cloud-based memory system associated with the cloud-based server.

At step 512, the cloud-based storage server processes data objects to determine application creation and/or application access information. In some embodiments, processing the data objects include scanning at least one data object for identifiers or markers that identify the application that created the data object.

In some embodiments, the cloud-based storage server tracks the applications that create or access the data objects resulting in tracking information. The tracking information can be stored in the cloud-based memory system associated with the cloud-based server and accessed with the data objects to determine the application creation and/or access information. In some embodiments, the cloud-based storage server receives the tracking information from the one or more remote computing devices. As discussed, the tracking information can identify the applications that create or access the data objects.

At step 514, the cloud-based storage server classifies data objects according to application creation and/or application access information resulting in application classification information.

In some embodiments, the cloud-based storage server classifies data objects by marking, linking or tagging the data object with the corresponding application that created or accessed the particular data object. This can include addition additional field information or creating a separate object that includes the application classification information. In some embodiments, the cloud-based storage server further classifies the data objects according to a type of access by the one or more remote computing devices. For example, read access only, read/write (e.g., modify), etc.

Lastly, at step 516, the cloud-based storage server stores the application classification information. For example, the application classification information can be stored in a cloud-based memory system associated with the cloud-based server.

Figure 6:
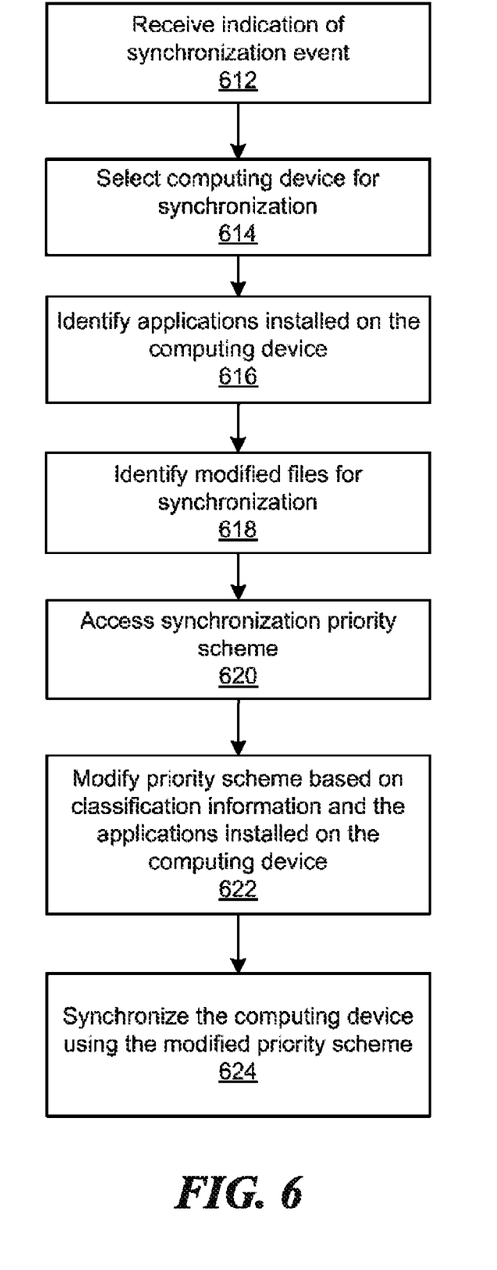
FIG. 6 is a flow diagram illustrating an example process of utilizing classified data objects to adjust a synchronization priority scheme in a cloud-based storage environment having a distributed file system.

FIG. 6 is a flow diagram illustrating an example process 600 for utilizing classified data objects to adjust a synchronization priority scheme in a cloud-based storage environment having a distributed file system, according to an embodiment. One or more cloud-based storage server of a cloud storage service e.g., cloud storage service 110 of FIG. 1, among other functions, perform the example process 600.

To begin, at step 612, the cloud-based storage server receives an indication of synchronization event. The synchronization event can be triggered by a computing device and/or the cloud-based storage server. At step 614, the cloud-based storage server selects a computing device for synchronization. It is appreciated that the cloud-based storage server may synchronize any number of computing devices simultaneously or concurrently.

At step 616, the cloud-based storage server identifies applications installed on the computing device. In some embodiments, the cloud-based storage server can identify the applications installed on a particular computing device by querying the device and responsively receiving the installed application information. Alternatively or additionally, the cloud-based storage server can maintain application configuration files for one or more of the computing devices in the cloud storage service, e.g., cloud storage service 110. The application configuration files can then be accessed by the cloud-based storage server to identify the installed applications when the cloud-based storage server is synchronizing a particular device. In some embodiments, the application configuration files can be maintained by receiving updates from the computing devices when the computing devices install new applications, periodically by querying the computing devices, etc.

At step 618, the cloud-based storage server identify modified files for synchronization. For example, the cloud-based storage server can identify and/or otherwise determine when files in the distributed file system are out of sync by querying the computing devices and/or receiving queries/updates from the computing devices.

At step 620, the cloud-based storage server accesses a synchronization priority scheme. In some embodiments, the synchronization priority scheme defines the criterion for determining how to batch files for synchronization. For example, with no priority a synchronization scheme for a device may simply batch all modified data objects or just the updates to the modified data objects (e.g., in one or more diff files) and send the entire update (synchronization) to the computing device. Alternatively, the technology described herein allows the cloud-based storage server to, for example, de-prioritize (or not send) data objects that are not as urgent. For example, data objects that are created by applications that are not installed on a computing device may not be transferred to the device during synchronization or may be de-prioritized. Similarly, data objects that are accessed by applications that are not installed on a computing device may not be transferred to the device during synchronization or may be de-prioritized.

Similarly, data objects that are modified by an application that is not installed on a particular device may be de-prioritized (e.g., batched with other less urgent file system updates). In one embodiment, the system may determine to send less urgent file system updates (synchronizations) based on an access network (e.g., 3G/4G vs. WiFi), etc.

At step 622, the cloud-based storage server modifies the priority scheme based on classification information and the applications installed on the computing device. For example, instead of all modified data objects having the same priority and being batched and sent to a computing device to synchronize the device, the priority of some data objects can de-prioritized and/or completely removed from the synchronization schedule. In some embodiments, as discussed above, data objects that are created by applications that are not installed on a computing device may not be transferred to the device during synchronization or may be de-prioritized. Similarly, data objects that are accessed by applications that are not installed on a computing device may not be transferred to the device during synchronization or may be de-prioritized.

Lastly, at step 624, the cloud-based storage server synchronizes the computing device using the modified priority scheme.

Figure 7:
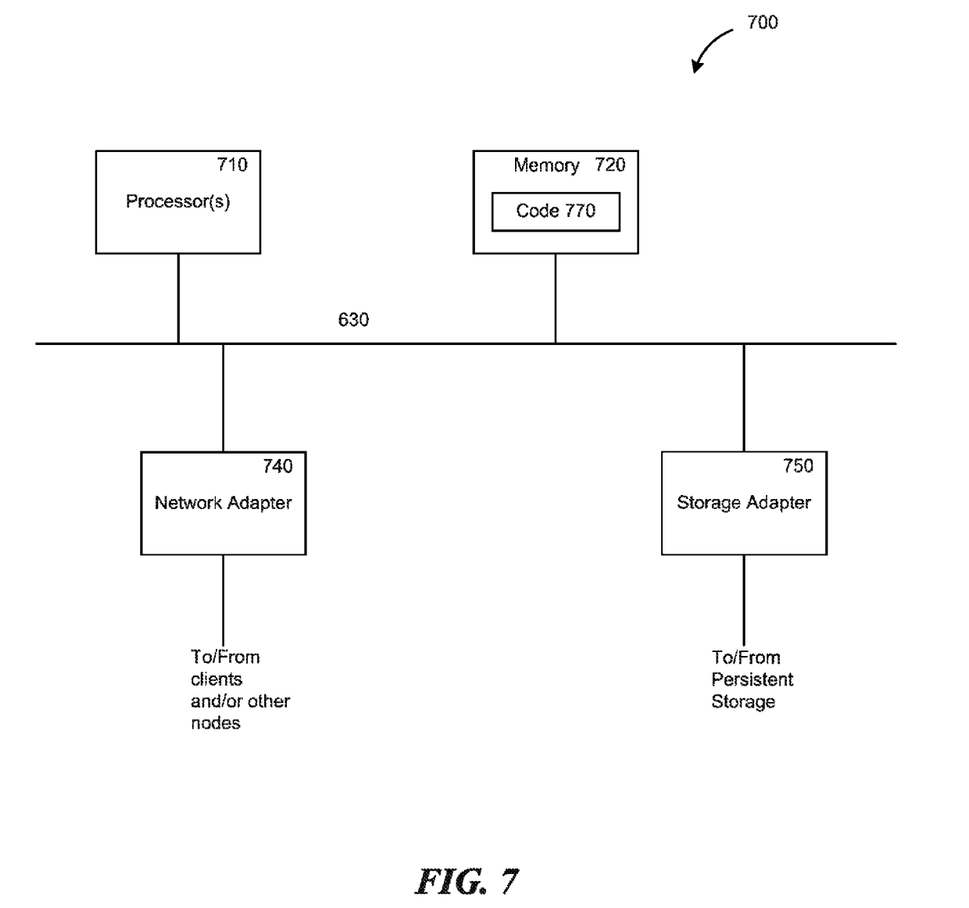
FIG. 7 is a block diagram of a computer system as may be used to implement features of some embodiments of the disclosed technology.

FIG. 7 is a block diagram of a computer system as may be used to implement features of some embodiments of the disclosed technology. The computing system 700 may be used to implement any of the entities, components or services depicted in the examples of FIGS. 1-11 (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described technology. In addition, the data structures and message structures may be stored or transmitted via a data transmission medium, such as a signal on a communications link. Various communications links or access networks may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the computing system 700 by downloading it from a remote system through the computing system 700 (e.g., via network adapter 730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method comprising:
   retrieving, by a cloud-based server, data objects from a distributed file system;
   processing, by the cloud-based server, the data objects to determine applications on one or more remote computing devices that created or accessed respective ones of the data objects;
   classifying the data objects according to corresponding applications that created or accessed the data objects resulting in application classification information, the application classification information associating each data object with a set of applications that created or accessed the data object;

storing the application classification information in a cloud-based memory system associated with the cloud-based server;

identifying modified data objects in the distributed file based system;

accessing, by the cloud-based server, a synchronization priority scheme for a particular remote computing device, wherein the synchronization priority scheme indicates a priority for synchronizing the modified data objects to the particular remote computing device; and modifying, by the cloud-based server, the synchronization priority scheme based on the application classification information and a plurality of applications installed on the particular remote computing device, wherein a modified data object is deprioritized in the synchronization priority scheme when the plurality of applications installed on the particular remote computing device and the associated set of applications that created or accessed the modified data object are disjoint, wherein a regular modified data object is batched in a first synchronization batch, wherein a deprioritized modified data object is batched in a second synchronization batch, wherein data objects in the second synchronization batch are synchronized to the particular remote computing device based on a type of an access network, and wherein data objects in the first synchronization batch are synchronized to the particular remote computing device regardless of the type of the access network.

2. The computer-implemented method of claim 1, wherein classifying a particular data object comprises marking, linking or tagging the particular data object with the corresponding application that created or accessed the particular data object.

3. The computer-implemented method of claim 1, wherein processing the data objects include scanning at least one data object for identifiers or markers that identify the application that created or accessed the data object.

4. The computer-implemented method of claim 1, wherein the data objects are further classified according to a type of access by the one or more remote computing devices.

5. The computer-implemented method of claim 1, further comprising:
receiving, by the cloud-based server, the data objects or modifications to the data objects from the one or more remote computing devices; and
storing the data objects or modifications to the data objects in the cloud-based memory system associated with the cloud-based server.

6. The computer-implemented method of claim 1, further comprising:
tracking, by the cloud-based server, the applications that create or access the data objects resulting in tracking information; and
storing the tracking information in the cloud-based memory system associated with the cloud-based server.

7. The computer-implemented method of claim 1, further comprising:
receiving, by the cloud-based server, tracking information from the one or more remote computing devices, wherein the tracking information identifies the applications that create or access the data objects.

8. The computer-implemented method of claim 1, further comprising:
receiving an indication of synchronization event; and
responsive to the synchronization event, synchronizing, by the cloud-based server, the particular remote computing device based on the modified synchronization priority scheme.

9. A computer-implemented method comprising:
retrieving, by a cloud-based server, data objects from a distributed file system;
processing, by the cloud-based server, the data objects to determine applications on one or more remote computing devices that created or accessed respective ones of the data objects;
classifying the data objects according to corresponding applications that created or accessed the data objects resulting in application classification information, wherein classifying a particular data object comprises marking, linking or tagging the particular data object with a corresponding application that created or accessed the particular data object;
identifying modified data objects in the distributed file based system;
accessing, by the cloud-based server, a synchronization priority scheme for a particular remote computing device, wherein the synchronization priority scheme indicates a priority for synchronizing the modified data objects to the particular remote computing device;
modifying, by the cloud-based server, the synchronization priority scheme based on the application classification information and a plurality of applications installed on the particular remote computing device; and
synchronizing, by the cloud-based server, the particular remote computing device based on the modified synchronization priority scheme,
wherein a modified data object is deprioritized in the synchronization priority scheme when the plurality of applications installed on the particular remote computing device and the associated set of applications that created or accessed the modified data object are disjoint, wherein a regular modified data object is batched in a first synchronization batch, wherein a deprioritized modified data object is batched in a second synchronization batch, wherein data objects in the second synchronization batch are synchronized to the particular remote computing device based on a type of an access network, and wherein data objects in the first synchronization batch are synchronized to the particular remote computing device regardless of the type of the access network.

10. The computer-implemented method of claim 9, wherein processing the data objects include scanning at least one data object for identifiers or markers that identify an application that created the data object and an application that accessed the data object.

11. The computer-implemented method of claim 9, wherein the data objects are further classified according to a type of access by the one or more remote computing devices including read access and read/write access.

12. A cloud-based server system comprising:
a processor;
a memory system having instructions stored thereon, wherein the instructions, when executed by the processor, cause the cloud-based system to:
retrieve data objects from a distributed file system;
process the data objects to determine applications on one or more remote computing devices that created or accessed respective ones of the data objects;
classify the data objects according to corresponding applications that created or accessed the data objects resulting in application classification information, the application classification information associating each data object with a set of applications that created or accessed the data object;

store the application classification information in a cloud-based memory system associated with the cloud-based server;

access, by the cloud-based server, a synchronization priority scheme for a particular remote computing device, wherein the synchronization priority scheme indicates a priority for synchronizing the modified data objects to the particular remote computing device;

modify, by the cloud-based server, the synchronization priority scheme based on the application classification information and a plurality of applications installed on the particular remote computing device; and synchronize, by the cloud-based server, the particular remote computing device based on the modified synchronization priority scheme, wherein a modified data object is deprioritized in the synchronization priority scheme when the plurality of applications installed on the particular remote computing device and the associated set of applications that created or accessed the modified data object are disjoint, wherein a regular modified data object is batched in a first synchronization batch, wherein a deprioritized modified data object is batched in a second synchronization batch, wherein data objects in the second synchronization batch are synchronized to the particular remote computing device based on a type of an access network, and wherein data objects in the first synchronization batch are synchronized to the particular remote computing device regardless of the type of the access network.

13. The cloud-based server system of claim 12, wherein classifying a particular data object comprises marking, linking or tagging the particular data object with the corresponding application that created or accessed the particular data object.

14. The cloud-based server system of claim 12, wherein, to process the data objects, the processor scans at least one data object for identifiers or markers that identify the application that created or accessed the data object, and wherein the processor further classifies the data objects according to a type of access by the one or more remote computing devices.

15. A non-transitory computer-readable storage medium storing instructions to be implemented by a computer system having a processor, wherein the instructions, when executed by the processor, cause the computer system to:

retrieve data objects from a distributed file system;

process the data objects to determine applications on one or more remote computing devices that created or accessed respective ones of the data objects;

classify the data objects according to corresponding applications that created or accessed the data objects resulting in application classification information, the application classification information associating each data object with a set of applications that created or accessed the data object;

store the application classification information in a cloud-based memory system associated with the computer system;

identify modified data objects in the distributed file based system;

access a synchronization priority scheme for a particular remote computing device, wherein the synchronization priority scheme indicates a priority for synchronizing the modified data objects to the particular remote computing device;

modify the synchronization priority scheme based on the application classification information and a plurality of applications installed on the particular remote computing device; and synchronize the particular remote computing device based on the modified synchronization priority scheme, wherein a modified data object is deprioritized in the synchronization priority scheme when the plurality of applications installed on the particular remote computing device and the associated set of applications that created or accessed the modified data object are disjoint, wherein a regular modified data object is batched in a first synchronization batch, wherein a deprioritized modified data object is batched in a second synchronization batch, wherein data objects in the second synchronization batch are synchronized to the particular remote computing device based on a type of an access network, and wherein data objects in the first synchronization batch are synchronized to the particular remote computing device regardless of the type of the access network.

16. The non-transitory computer readable medium of claim 15, wherein classifying a particular data object comprises marking, linking or tagging the particular data object with the corresponding application that created or accessed the particular data object.

* * * * *